United States Patent [19]

Potter et al.

[11] Patent Number: 5,170,477
[45] Date of Patent: Dec. 8, 1992

[54] ODD BOUNDARY ADDRESS ALIGNED DIRECT MEMORY ACESS DEVICE AND METHOD

[75] Inventors: David W. Potter, Jeffersonville; Ralph J. Scaccia, Burlington, both of Vt.

[73] Assignee: IBM Corporation, Armonk, N.Y.

[21] Appl. No.: 430,693

[22] Filed: Oct. 31, 1989

[51] Int. Cl.⁵ .......................................... G06F 13/28
[52] U.S. Cl. .......................... 395/425; 364/DIG. 1; 364/242.3; 364/260; 364/260.1; 364/259; 364/259.5
[58] Field of Search ... 364/200 MS File, 900 MS File; 395/425

[56] References Cited

U.S. PATENT DOCUMENTS

| | | | |
|---|---|---|---|
| 4,271,466 | 6/1981 | Yamamoto et al. | 364/200 |
| 4,309,754 | 1/1982 | Dinwiddie, Jr. | 395/250 |
| 4,346,439 | 8/1982 | Huno et al. | 364/200 |
| 4,471,427 | 9/1984 | Harris | 364/200 |
| 4,542,457 | 9/1985 | Mortensen et al. | 364/200 |
| 4,545,014 | 10/1985 | Oguchi | 364/200 |
| 5,038,320 | 8/1991 | Heath et al. | 395/425 |
| 5,067,075 | 11/1991 | Sugano et al. | 395/425 |

FOREIGN PATENT DOCUMENTS 0127007 12/1984 European Pat. Off.
0290172 11/1988 European Pat. Off.

OTHER PUBLICATIONS

IBM Technical Disclosure Bulletin, Dec. 1984, pp. 4247-4248, vol. 27, No. 7B.

Primary Examiner—Joseph L. Dixon
Assistant Examiner—Rebecca L. Rudolph
Attorney, Agent, or Firm—Sughrue, Mion, Zinn, Macpeak & Seas

[57] ABSTRACT

A system for transferring a plurality of data items (bytes) between a source device and a destination device. The system loads data items from the source device into a register so as to align the data items with the storage locations of the destination device, transfers the aligned data items to the destination device, rolls-down, in sequence, any remaining data items in the register to least significant storage locations thereof; loads a full data word, which includes a predetermined number N of data items, from the source device into the register starting with the most significant storage location of the register containing a data item; and transfers N or fewer data items stored in the register, starting from the least significant storage location of the register to the destination device.

20 Claims, 6 Drawing Sheets

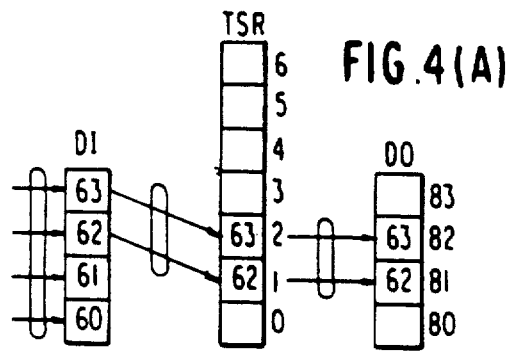
FIG.4(A)
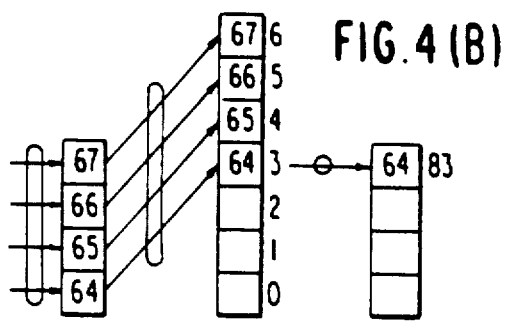
FIG.4(B)
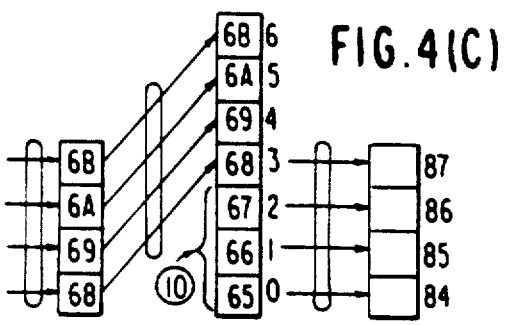
FIG.4(C)
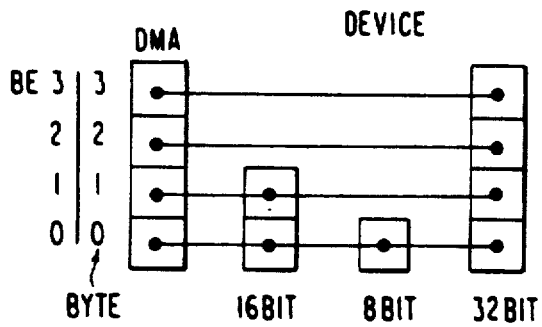
FIG.5
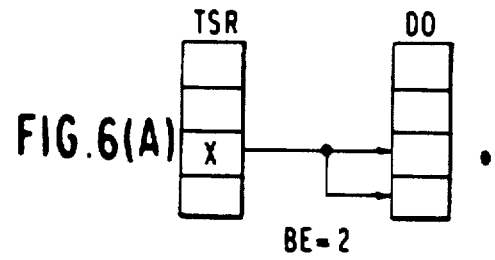
FIG.6(A)  BE=2
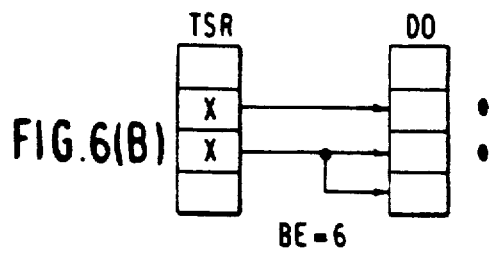
FIG.6(B)  BE=6
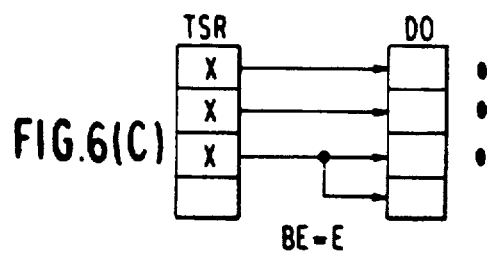
FIG.6(C)  BE=E
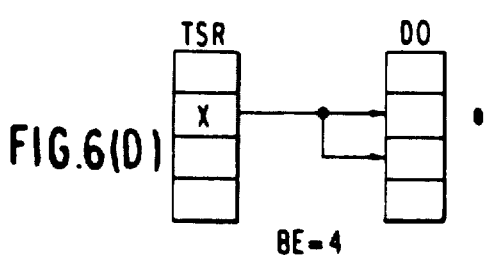
FIG.6(D)  BE=4
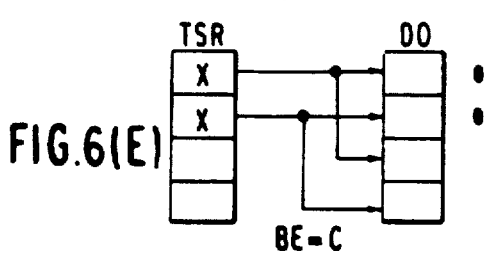
FIG.6(E)  BE=C
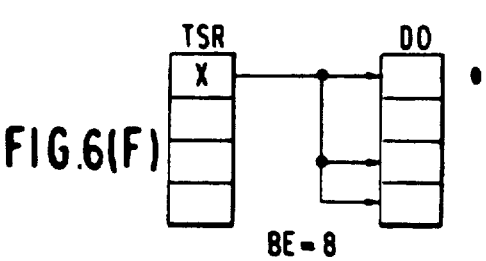
FIG.6(F)  BE=8

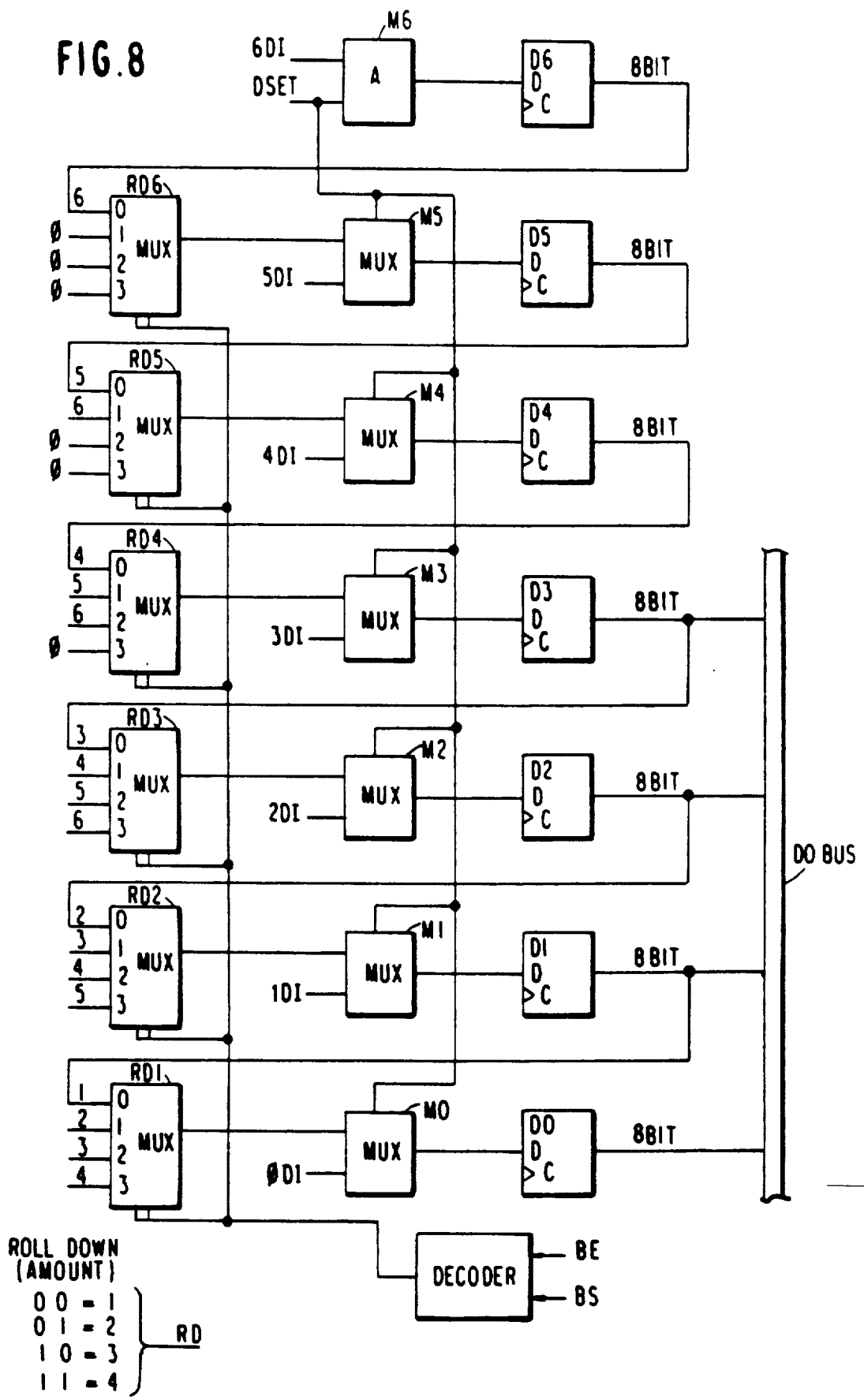

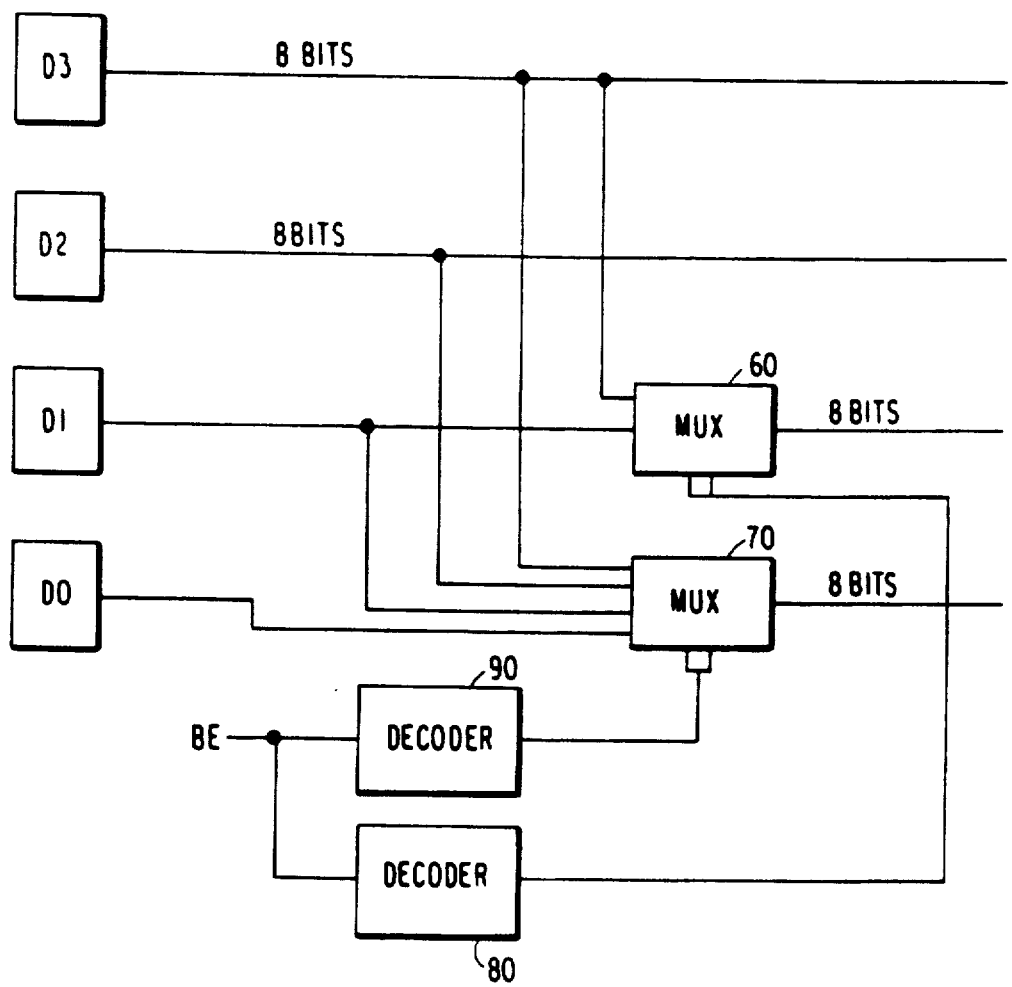

ODD BOUNDARY ADDRESS ALIGNED DIRECT MEMORY ACESS DEVICE AND METHOD

FIELD OF THE INVENTION

The present invention relates to a data transfer method and device for a data processing system. In particular, the invention relates to a method and device for a Direct Memory Access (DMA) controller which allow data items (bytes) to be transferred between a source and a destination device.

BACKGROUND OF THE INVENTION

A conventional data processing system includes a main memory, a Central Processing Unit (CPU) and a peripheral device (e.g., an input/output device or a peripheral memory). In such a data processing system, information (data) is transferred under the control of the CPU which executes a transfer operation according to a program stored therein.

In order to improve system performance of the conventional data processing system, it is known to employ a Direct Memory Access (DMA) controller, thereby forming a so-called DMA data-processing system which improves system performance by executing data transfers between the main memory and the peripheral unit without the use of the CPU. In a DMA data processing system, data is transferred in data blocks from a source device to an area of a destination device so that the data transfer can be effected at a high speed. A data block refers to data items (e.g., bytes) stored in a plurality of consecutive address or storage locations. The general process of a DMA data processing system will now be described.

When a block data transfer is to be performed, the peripheral unit of the DMA processing system sends to the DMA controller a "request" signal requesting the execution of a block data transfer from or to the main memory. After receiving the request signal, the DMA controller sends a "hold" request signal to the CPU. The CPU determines, after each instruction cycle, whether the hold request signal has been sent by the DMA controller. Upon determining that the hold request signal has been sent, the CPU relinquishes control of the system buses to the DMA controller which can then directly transfer a data block between the main memory and the peripheral device. Once the block data transfer is completed, the DMA controller relinquishes control of the system buses back to the CPU.

U.S. Pat. Nos. 4,271,466, 4,346,439, 4,471,427, 4,542,457 and 4,545,014 are examples of known direct memory access data processing systems. These cited patents, which are expressly incorporated herein by reference, provide a background understanding of direct memory access data processing systems.

In direct memory access control systems, before a DMA controller can directly transfer a data block from the source device to a destination device (e.g., a memory), the DMA controller must align the source device addresses or storage locations which contain the data block with the addresses or storage locations of the destination device. More specifically, before the data block can be transferred to the destination device, the starting address of the source device (i.e., the starting address of the data block) must be aligned with the specified starting address of the destination device. This technique is known as boundary alignment. Odd boundary alignment refers to the situation in which, for example, the position of the starting address of the source device relative to a data word location which contains the starting address does not correspond to the same position of the starting address of the destination device relative to the destination device data word which contains the starting address. For example, consider two memories, each consisting of a plurality of double datawords (i.e., four consecutive (8-bit) bytes). The address 61 (HEX) corresponds to the "second" byte of the double word consisting of data addresses 60–63 (HEX). The address 83 (HEX) corresponds to the "fourth" or "last" byte of the double word consisting of data addresses 80–83. If the starting address of the source device is 61 and the starting address of the destination device is 83, then there would be odd boundary alignment because data address 61 (which corresponds to the second position of the double word 60–63) is being transferred to address 83 of the destination device (which corresponds to the fourth or last position of the double word 80–83).

IBM Technical Disclosure Bulletin, December, 1984, pp. 4247–4248 discloses a shifter network that is used in a DMA mode of operation to perform memory-to-memory transfers on odd boundary addresses from a master device to a slave device. The shifter network consists of three registers of four bytes each. The first register communicates with the master, and the third register communicates with the slave. Data from the master is loaded into the shifter network and is shifted up or down by the amount of address misalignment or mismatch with the slave. The resulting aligned data is then transferred to the slave via the third register. Any data left in the shifter network is sent to the third register in inverted format, and then more data is loaded from the master. The data is then shifted by the number of bytes now stored in the third register such that the third register subsequently transfers a full word of data.

Although this reference discloses a system for aligning data on odd address boundaries, it does not consider data transfers by a DMA controller between source and destination devices which are smaller than the DMA controller (i.e., a DMA controller which has a 32-bit bus width and which performs a data transfer between 16-bit or 8-bit size source/destination devices). Further, the system is somewhat complicated since it requires that data remaining in the shifter network, after a transfer step, be inverted, and sent to another register.

SUMMARY OF THE INVENTION

It is an object of the present invention to provide an improved method and device for performing data transfers on odd boundary addresses.

It is another object of the invention to provide a method and device for performing data transfers on odd boundary addresses which can be easily implemented and which is not complicated.

It is still another object of the invention is to provide a method and device for performing data transfers on odd boundary addresses between different size source/destination devices in a DMA data-processing system.

The present invention accomplishes these and other objects by providing a direct memory access method and device for transferring a plurality of data items (e.g., bytes) between a source and a destination device on odd boundaries with a minimum of processing time. The invention includes a temporary storage register for storing 2N-1 bytes, N being the maximum number of bytes on the data bus. Up to one full data word (i.e., N or fewer bytes) from the source device is loaded into the temporary storage register, and is aligned, to the extent possible, with the starting address of the destination device. The aligned data item(s) (byte(s)) in the register is/are then transferred to the destination device, and any remaining data item(s) in the register is/are rolled-down to the least significant storage location of the register, and the next full data word is loaded into storage locations of the register, starting with the most significant storage location which does not contain a data item. The data item stored in the lowest significant storage locations, up to a full data word (i.e., N or fewer bytes or data items), are transferred to the destination device, and the remaining data item(s) in the register is/are rolled-down. The data transfer operation continues until all the data items are transferred.

One of the particularly important features of the invention is that, after the first several transfers of data items from the source device, data is transferred to the destination device in full data word increments (i.e., N data items or bytes), thereby improving the processing speed of the data transfer system.

BRIEF DESCRIPTION OF THE DRAWINGS

FIGS. 4(A)-4(C) show a second example of the operation shown in FIG. 2.

FIG. 5 shows the I/O bus connection between a DMA controller and 32-, 16- and 8-bit devices.

FIGS. 6(A)-6(F) shows examples of situations which require the data duplication method according to the invention.

FIG. 8 is a schematic diagram of the temporary storage register and gating circuitry of the DMA controller of FIG. 1.

FIG. 9 is a table showing the relationship between a byte enable signal BE and the roll-down amount signal RD and device size according to the invention.

FIG. 10 is a schematic diagram of the gating circuitry of FIG. 1 for performing data duplication.

PREFERRED EMBODIMENT OF THE INVENTION

Figure 1:
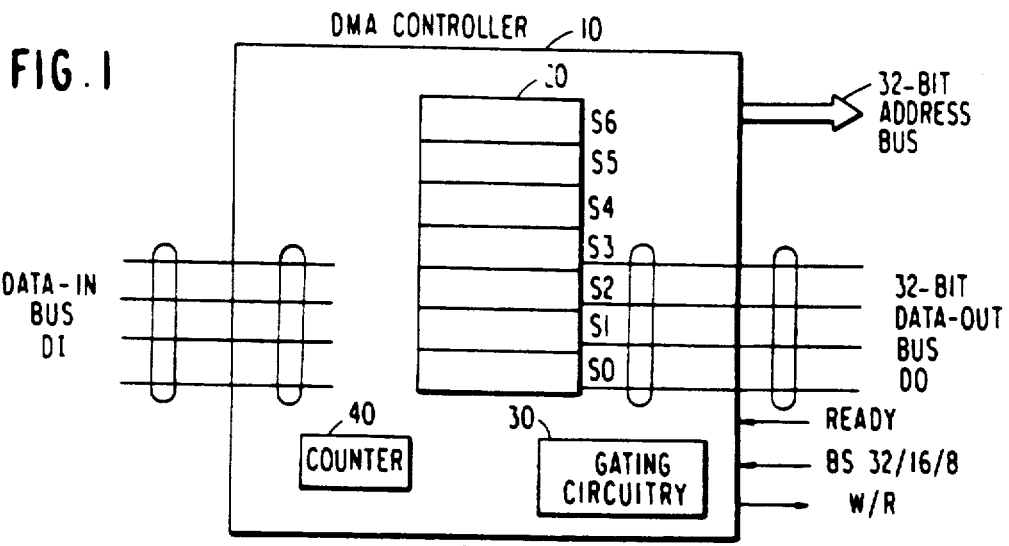
FIG. 1 shows a general outline of the DMA controller according to the invention.

FIG. 1 shows a general outline of the DMA controller 1 according to the present invention. Many commercially available DMA controllers may be used to implement the present invention. For example, the Intel 8237A-5 programmable DMA controller includes many of the components and programming functions necessary for implementing the present invention. Further, the DMA controllers described in the abovecited prior art references contain many of the components and programming functions for implementing the DMA controller according to the invention. However, referring to FIG. 1, the DMA controller 10 according to the invention includes a buffer memory, in the form of a temporary storage register (TSR) 20, for temporarily storing data item(s) to be transferred to a destination device, gating circuitry 30 for the temporary storage register 20, and a counter 40 for keeping count of the data item(s) temporarily stored in the DMA controller 10. As shown in FIG. 1, the temporary storage register 20 has seven separate storage locations 0-6, each of which can store 1-byte (i.e., 1 data item). Only storage locations 0-3 are coupled to the data-out bus DO of the DMA controller 10, while a data item may be read into any one of the storage locations 0-6 via the data-in bus DI. As is known, the data-in and data-out buses may be two separate 32-bit-wide buses, or a single bidirectional 32-bit-wide data-in/data-out bus. The DMA controller 10 further includes a 32-bit address bus, two bits (BS) indicating whether the source/destination device is a 32-bit, 16-bit or an 8-bit size device, a write/read line W/R and a ready line indicating whether the source/destination device is ready to perform a data transfer. Certain bits of the address lines are designated for a byte enable (BE) signals which indicates to the destination device where on the data-out bus (DO) the destination device can find valid data. As shown in FIG. 1, the 32-bit wide data bus includes four parallel 8-bit lines. The byte enable signals (BE) indicates to the destination device which one of the four lines contains valid data. Since data may be supplied on one or more of the four 8-bit lines, four bits of the address signal are designated for the byte-enable signal (i.e., four bits or BE bits 0-3 are necessary to cover all "valid" combinations of the byte enable signals). These valid combinations are those having byte enables that are contiguous when more than one BE bit is enabled.

Figure 2:
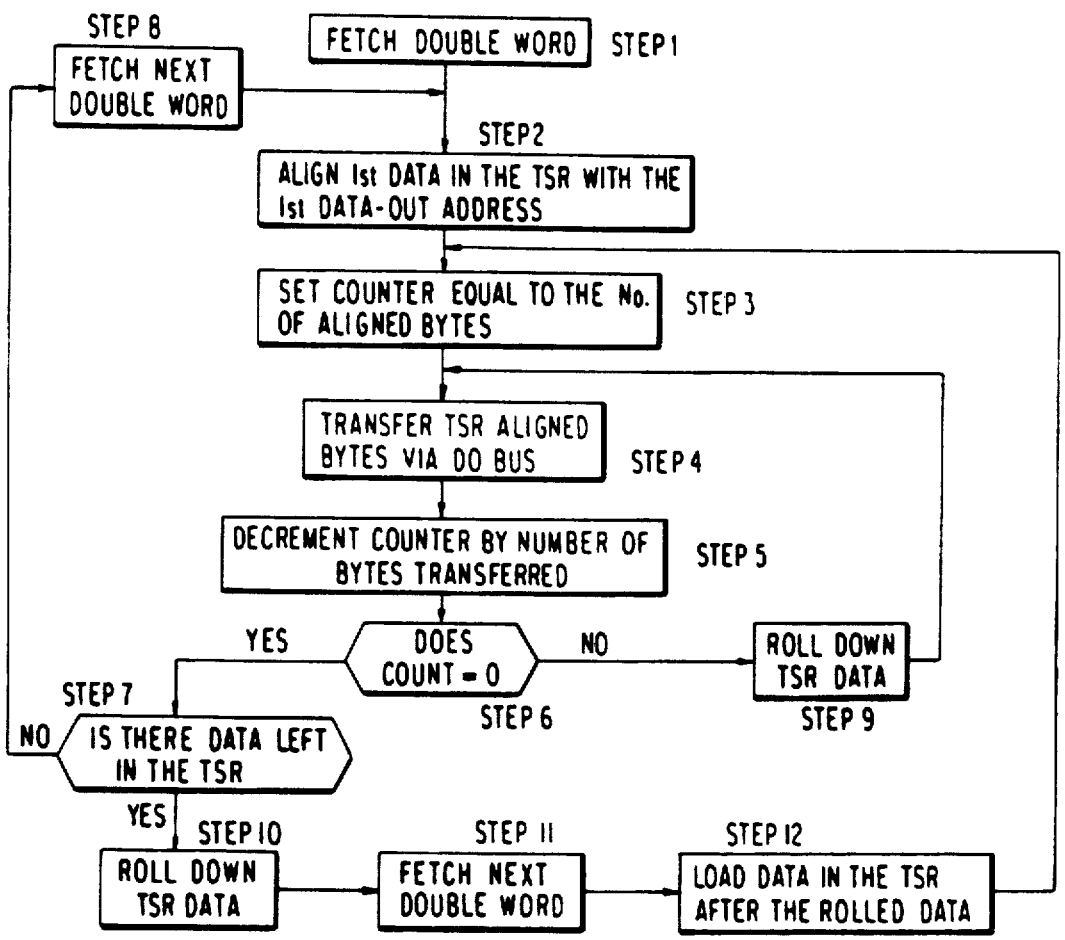
FIG. 2 is a flowchart of the operation of the DMA controller according to the invention.

FIG. 2 is a flowchart of the data transfer operation of the DMA controller according to the invention. In particular, FIG. 2 depicts the transfer operation of data from a source device to a destination device. The source and destination devices may both be, for example, memories.

As discussed above, the data to be transferred from the source device to the destination device in a DMA mode of operation actually consist of a plurality of data items (bytes) known as data blocks. The data block to be transferred may be viewed as a sequence of (8-bit) bytes or data items, with each byte being stored in a different address or storage location. Two consecutive bytes (i.e., two consecutive address locations, each containing a byte of data) correspond to a (16-bit) word, and four consecutive bytes correspond to a (32-bit) double word. In order to transfer a data block from the source device (e.g., a first memory) to the destination device (e.g., a second memory), the DMA controller must receive a starting or initial address or storage location of the source device, which starting address corresponds to the address in which the first byte of data to be transferred is located, along with the total amount of data (e.g., the total number of bytes) to be transferred. In the case where the destination device is a memory, the DMA controller also needs to receive that address location of the destination device where the first byte of data transferred from the source device is to be stored.

Referring to FIG. 2, the block data transfer operation according to the invention includes twelve steps labelled steps 1-12. These twelve steps will first be generally described, followed by specific examples of block data transfers.

In step 1, the DMA controller 10 fetches a double word of data from the source device. As indicated above, a double word of data corresponds to four consecutive data bytes. The required bytes of data is then loaded into the temporary storage register 20 such that the data byte corresponding to the source device starting address (hereinafter "the first data-in address") is aligned in step 2 with the destination device starting address (hereinafter "the first data-out address"). As indicated above, the starting addresses for both the source and destination devices are supplied to the DMA controller. This "alignment" process will be described in detail in connection with the specific examples shown in FIGS. 3, 4 and 6.

The counter 40 is then set equal to the number of aligned data bytes in the temporary storage register in step 3, and these aligned data byte(s) are transferred to the destination device via the data-out bus DO in step 4. The counter 40 is then decremented, in step 5, by the number of aligned bytes transferred in step 4. In step 6, the DMA controller 10 then determines whether the decremented counter 40 is equal to zero. If the counter is equal to zero in step 6, then the process goes to step 7 where the DMA controller 10 determines whether or not any data items (bytes) are left in the temporary storage register. If the counter in step 6 is not equal to zero, then all of the data bytes left in the temporary storage register are "rolled-down" in step 9, and thereafter the process goes to step 4.

The roll-down of data byte(s) or item(s) in the temporary storage register 20 will also be described in detail in connection with FIGS. 3, 4 and 6. Briefly, the roll down operation refers to the transfer of data bytes from the least significant data filled storage locations of the temporary storage register to the least significant storage locations of the temporary storage register. The amount of roll-down in step 9 is equal to one more than the most significant storage location of the data bytes last transferred in step 4.

If in step 7 the DMA controller determines that no data item(s) is/are left in the temporary storage register 20, then the next double data word of the source device is fetched in step 8, and thereafter the operation proceeds to step 2. If the DMA controller 10 determines in step 7 that a data item(s) is left in the temporary storage register, then the roll-down operation of data items is performed in step 10 (i.e., each data item (byte) stored in the temporary storage register is rolled-down one more than the most significant storage location of the data items (bytes) last transferred in step 3).

The operation then proceeds to step 11 where the DMA controller 10 fetches the next double word from the source device, and the fetched double word is loaded into the temporary storage register 20 starting with the next most significant storage location after the rolled-down data in step 12. Thereafter, the operation proceeds to step 3.

The process shown in FIG. 2 will continue until the data block is transferred from the source device to the destination device.

Referring to FIGS. 3(A)-3(H), an example will now be described with reference to the steps of FIG. 2 for a data block stored in memory locations transfer from a 32-bit source device to a 32-bit destination device. In this example, a data block, stored in memory locations starting at address 61 (HEX) of the source device is to be transferred to the destination device, to memory locations having a starting address of 83 (HEX). Accordingly, for this example, the DMA controller 10 would be supplied with the starting addresses of the source and destination devices (i.e., 61 and 83), along with the total amount of data to be transferred.

Figure 3A:
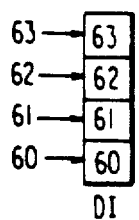
FIGS. 3(A)-3(H) show a first example of the operation shown in FIG. 2.

In the description to follow the phrases "data address X" (or more generically "data addresses") refers to data stored in memory locations starting at address X as described above, since data address 61 is within the double word consisting of addresses 60-63 (HEX), these data addresses are fetched by the DMA controller and placed on the data-in bus DI, as shown in FIG. 3(A) (step 1). Since the first data-in address 61 is to be aligned with the first data-out address 83, and since data-out address 83 corresponds to the "last" or "fourth" byte of the double word consisting of data addresses 80-83, data addresses 61-63 are loaded into storage locations 3-5, respectively, of the temporary storage register as shown in FIG. 3(B). As shown in FIG. 1 and discussed above, the data-out bus (DO) is coupled to storage locations 0-3 of the temporary storage register 20. The loading of data address 61 in storage location 3 (i.e., the last or fourth storage location of the data bytes to be transferred to data-out bus DO) insures that data address 61 is aligned with or "pointed to" data address 83 of the destination device since data address 83 corresponds to the last or fourth byte of the double word consisting of data addresses 80-83.

Since only data bytes stored in locations 0-3 of the temporary storage register 20 are transferred to the output bus DO, only data bytes stored in these locations 0-3 can be "aligned" with addresses of the destination device.

The counter 40 is then set equal to one, since only 'data address' 61 is aligned in the temporary storage register 20 (step 3).

Figure 3E:
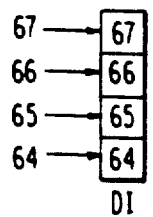
Figure 3B:
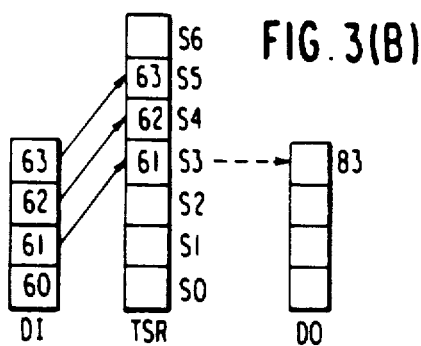
Figure 3F:
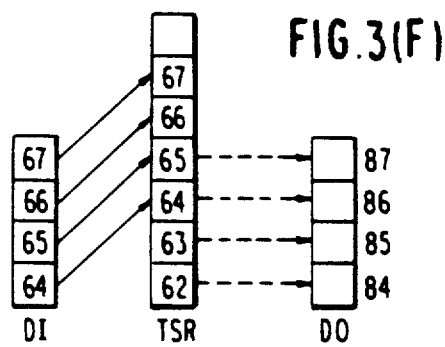
Figure 3C:
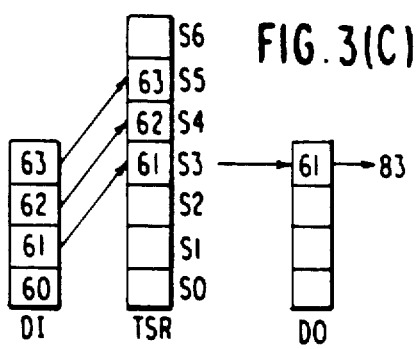

The aligned data byte 61 is then transferred to address 83 of the destination device via the data-out bus DO, as shown in FIG. 3(C) (step 4). The counter 40 which presently is set equal to one is then decremented by one since only one aligned data byte, 61 was transferred (step 5). Since the decremented counter 40 is equal to zero (step 6), and since data bytes at addresses 62 and 63 are still left in the temporary storage register 20 (step 7), the data roll-down operation (step 10) is performed.

Figure 3G:
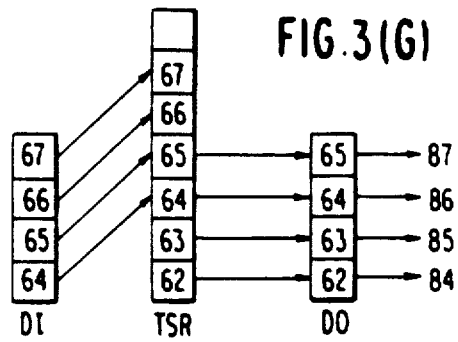
Figure 3D:
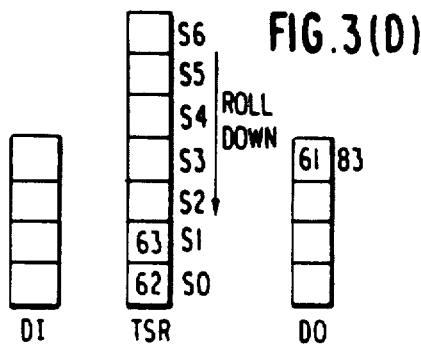

FIG. 3(D) shows the result of the roll-down operation of 'data addresses' 62 and 63. As discussed above, the amount of roll-down is equal to one more than the most significant storage location of the data bytes last transferred. In FIG. 3(B), 'data address' 61 (the only data byte transferred) was stored in storage location 3 of the temporary storage register 20. Accordingly, 'data addresses' 62 and 63 are each rolled-down four storage locations (4=3+1), to storage locations 0 and 1, respectively, as shown in FIG. 3(D) (step 10).

Figure 3H:
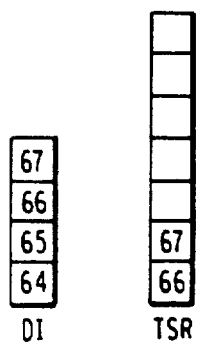

The next double word (i.e., 'data addresses' 64-67) is then fetched from the source device and placed on the data-in bus DI, as shown in FIG. 3(E) (step 11). This fetched double word is then loaded in the temporary storage register 20 after the rolled-down data 62 and 63 (step 12). As shown in FIG. 3(F), 'data addresses' 64-67 are loaded into storage locations 2-5, respectively, of the temporary storage register 20. The counter 40 is then set equal to four since storage locations 0-3 of the temporary storage register each contains a 'data address' (step 3). As shown in FIG. 3(G), the four aligned data addresses 62-65 are then transferred to the destination device via the data-out bus DO (step 4). The counter 40 is then decremented by four (i.e., the number of aligned data bytes transferred; step 5). Since the decremented counter 40 is equal to zero (step 6), and since 'data addresses' 66 and 67 are still left in the temporary storage register 20 (step 7), 'data addresses' 66 and 67 are rolleddown to storage locations 0 and 1, respectively, of the temporary storage register 20, as shown in FIG. 3(H) (step 10). More particularly, since the most significant storage location of the data bytes last transferred was location 3, data addresses 66 and 67 are each rolled-down four (4=3+1) storage locations.

The process would continue until all data items of the data block are transferred. Accordingly, the DMA controller needs to keep track of the number of data bytes transferred so it will know when the data block has been completely transferred. This can be accomplished by a counter which is initially set equal to the number of data bytes contained in the data block, and which is decremented each time a data byte is transferred from the temporary storage register. When this counter is equal to zero, all of the data bytes in the data block would be transferred.

Referring to FIGS. 4(A)–4(C), another example will be described for a block data transfer between a 32-bit source device and a 32-bit destination device. In this example, a data block starting at address 62 (HEX) of the storage device is to be transferred to the destination device beginning at address 81 (HEX).

Referring to FIG. 4(A), since the data address 61 is within the double word consisting of addresses 60–63, the DMA controller 10 fetches this double word from the source device and places it on the the data-in bus DI (step 1). Since the first data-in address 62 is to be aligned with the first data-out address 81 (which is the "second" byte of the double word 80–83), 'data address' 62 is loaded into storage location 1 (i.e., the "second" storage location) of the temporary storage register 20, and 'data address' 63 is loaded into storage location 2 (step 2). Since there are two data bytes (62 and 63) aligned in the temporary storage register 20, counter 40 is set equal to two (step 3). 'Data addresses' 62 and 63 are then transferred to the destination device via the data-out bus DO (step 4), and the counter 40 is decremented by two (step 5). Since the decremented counter 40 is equal to zero (step 6), and since no data items are left in the temporary storage register 20 (step 7), the next double word is fetched from the source device (step 8) and placed on the data-in bus Do, as shown in FIG. 4(B). The next fetched double word is then loaded into the temporary storage register 20 such that the first data-in address 64 is aligned with the first data-out address 83. Since address 83 of the destination device is the "fourth or last" byte of the double word consisting of addresses 80–83, data addresses 64–67 are loaded into storage locations 3–6 of the temporary storage register 20, respectively, as shown in FIG. 4(B) (step 2).

Thus, although 'data address' 64 is the first byte of the double word consisting of addresses 64–67 in the source device, data address 64 is not stored in location 0 of the temporary storage location 20 but, rather, in storage location 3, since data address 64 will be transferred to the fourth or last address 83 of the double word consisting of addresses 80–83 in the destination device.

The counter 40 is then set equal to one (step 3), and aligned data address 64 is transferred to the destination device via the data-out bus DO (step 4), as shown in FIG. 4(B).

The counter 40 is then decremented by one (step 5). Since the decremented counter 40 is equal to zero (step 6), and since 'data addresses' 65–67 are left in the temporary storage register 20 (step 7), these 'data addresses' 65–67 are rolled-down in the temporary storage register (step 10), and the next double word (i.e., 68, 69, 6A and 6B) is fetched from the source device (step 11). As shown in FIG. 4(C), the next fetched double word is loaded in the temporary storage register 20 after the rolled-down data 65–67 (step 12).

The process would continue until all data items (bytes) in the data block are transferred.

In the examples described above in connection with FIGS. 3 and 4, the source and destination devices were both 32-bit devices. However, in practice, it is desirable for the DMA controller 10 to perform data block transfers between 16- and 8-bit devices, as well as 32-bit devices. However, 16-bit and 8-bit devices do not receive all data bytes transferred by a DMA controller having a 32-bit wide I/O bus. More specifically, FIG. 5 shows the bus connection between the DMA controller 10 and a 32-, 16- and 8-bit device. As shown in FIG. 5, storage locations 0–3 of the temporary storage register 20 are coupled to the four 8-bit lines (BYTES), respectively, of the 32-bit data-out bus DO. Since a 32-bit device is coupled to receive data on all four BYTES of the DMA controller's 32-bit data-out bus DO, all data bytes transferred from storage locations 0–3 of the temporary storage register 20 will be received by a 32-bit device. However, a 16-bit device (which has a 16-bit-wide input bus) can receive data bytes transferred only from storage locations 0 and 1 of the temporary storage register 20. Further, an 8-bit device (which has an 8-bit-wide input bus) can receive a single data byte transferred only from storage location 0 of the temporary storage register 20. Thus, it is seen that a data byte stored in storage locations 2 or 3 of the temporary storage register 20 cannot be transferred to a 16- or 8-bit device.

In order for the DMA controller 10 to perform data transfers to 16-bit and 8-bit devices, as well as 32-bit devices, the present invention utilizes what may be termed a "data duplication" method. Sixteen bit devices cannot receive data bytes transferred from storage locations 2 and 3 of the temporary storage, register 20, 8 bit devices cannot receive data bytes transfer from storage locations 1, 2 and 3 of the TSR 20. In general, the data duplication method "duplicates" data during transfers to 8-bit and 16-bit devices, so that data which otherwise would not have been transferred can now be properly transferred.

FIGS. 6(A)–(F) show those data transfer situations in which data duplication is necessary. FIGS. 6(A)-6(F) also indicate the byte-enable signals (BE0–BE3) associated with each of these transfers. For example, in FIG. 6(A), the data byte from storage location 1 of the temporary storage register 20 is to be transferred. Since an 8-bit device can receive a data byte loaded only in storage location 0 of the temporary storage register 20, this transfer would be unsuccessful without data duplication if made to an 8-bit device. However, according to the data duplication method utilized in the invention, the data byte loaded in storage location 1 would also be supplied to that byte of the data bus DO corresponding to a transfer from storage location 0 of the temporary storage register 20, as shown by the arrows in FIG. 6(A). The byte-enable signals BE(0–3) corresponds to data byte(s) stored in locations 0–3 of the temporary storage register 20. More particularly, a data byte stored in location 0 corresponds to BE=1(HEX), a data byte stored in location 1 corresponds to BE=2(HEX), a data byte stored in location 2 corresponds to BE=4-(HEX) and a data byte stored in location 3 corresponds to BE=8(HEX) as indicated in FIG. 5. Thus, using this weighting system, ten different combinations, corresponding to the sixteen different possible combinations of data bytes stored in the temporary storage register 20, can be designated. HEX values 0, 5, 9, A, B, and D are not valid BE enable combinations because the TSR data must be contiguous. Since in FIG. 6(A) only one data byte is stored in location 1 of the temporary storage register, the byte-enable signal BE(0-3) is equal to (BE=2HEX).

As another example, in FIG. 6(E), data bytes are stored in locations 2 and 3 of the temporary storage register 20. Accordingly, only a 32-bit device could receive these data bytes since a 16-bit device can receive data bytes transferred only from TSR locations 0 and 1, and an 8-bit device can receive a data byte transferred only from TSR location 0. As shown by the arrows of FIG. 6(E), the data bytes stored in locations 2 and 3 are supplied on the data-out bus DO such that a 16-bit or an 8-bit device could receive the transferred data.

In FIG. 6(E), the byte-enable signal is equal to C(HEX) which corresponds to the data transfer situation shown in this figure in which data bytes from locations 2 and 3 of the temporary storage register 20 are to be transferred. The circuitry for implementing the data duplication method discussed above will be described in connection with FIG. 8.

FIGS. 7(A)-7(D) show another example of a block data transfer between a source device and a destination device. In this example, both the source and the destination devices are 16-bit devices (i.e., devices having 16-bit-wide data I/O buses). Accordingly, the DMA controller 10 would receive a signal on bit-size line BS (FIG. 1) indicating that both the source and destination devices are 16-bitsize devices.

In this example, a data block starting at address 61 (HEX) of the source device is to be transferred to a destination device starting at address 82 (HEX). The 'data address' 61 is within the double word consisting of addresses 60-63. Accordingly, data addresses 60-63 are fetched from the source device and placed on the data-in bus DI. Although the DMA controller is a 32-bit device and therefore can fetch a (32-bit) double word, since the source device is a 16-bit device, only one (16-bit) word can be fetched at a time from the source device. Accordingly, data bytes 60 and 61 would first be fetched and placed on the data-in bus DI, and then 'data addresses' 62-63 would be fetched and placed on the data-in bus DI (step 1). Thus, it is seen that in the case where the source device is less than 32-bits (e.g., 16- or 8-bit devices) the DMA controller 10 must stay in the fetch loop until the double word boundary is reached in the case of 4 byte wide bus.

Figure 7A:
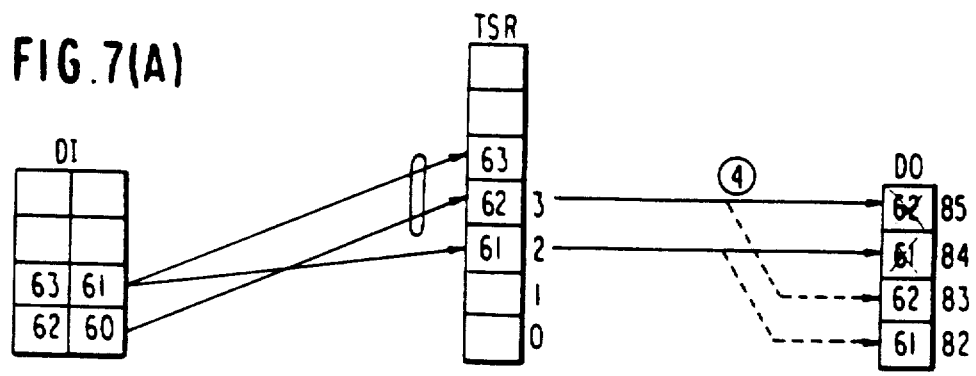
FIGS. 7(A)-7(D) show a third example of the operation shown in FIG. 2.

Once the double word (i.e., 'data addresses' 60-63) is fetched, these data addresses are loaded into the temporary storage register 20 such that the first data-in address 61 is aligned with the first data-out address 82. Since 'data address' 82 is the "third" address of the double word consisting of addresses 80-83, data addresses 61-63 are loaded into storage locations 2-4 of the temporary storage register 20. In particular, data address 61 is loaded into the "third" storage location 2 of the temporary storage register 20 and therefore is aligned with the first data-out address 82 of the destination device (step 2). The counter 40 is then set equal to two since locations 2 and 3 contain data bytes (step 3). The aligned data addresses 61-62 would then be transferred to addresses 82 and 83, respectively, of the destination device via the data-out bus DO. However, since the destination device is a 16-bit device, it can receive data bytes transferred only from storage locations 0 and 1 of the temporary storage register 20. Accordingly, 'data addresses' 61 and 62 are data duplicated on the data-out bus DO at locations 0 and 1 to align with addresses 82 and 83 for to the smaller size device (16-bits), as shown in FIG. 7(A). This allows the 16-bit device to receive data addresses 61 and 62.

Thereafter, counter 40 is decremented by two (i.e., the number of aligned bytes transferred; step 5). Since the decremented counter 40 is equal to zero (step 6), and since 'data address' 63 remains in the temporary storage register 20 (step 7), this 'data address' 63 is rolled-down in the temporary storage register 20. More particularly, since the most significant storage location of the last transferred data bytes from temporary register 20 is storage location 3, data address 63 is rolled-down four storage locations (4=3+1) from storage location 4 to storage location 0 (step 10), as shown in FIG. 7(B).

Figure 7B:
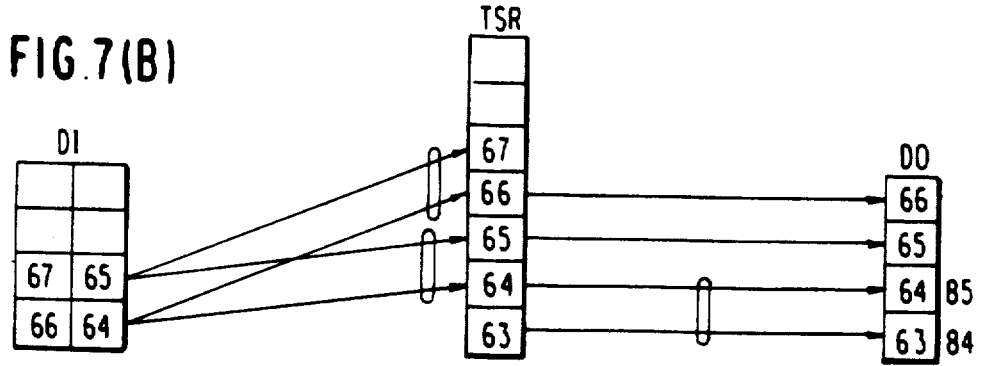

Thereafter, the next double word (i.e., 64-67) is fetched (step 11), and the fetched double word is loaded into the temporary storage register 20 after the rolled-down data address 63 (step 12), as shown in FIG. 7(B). The counter 40 is then set equal to four (i.e., the number aligned bytes in temporary storage register 20; step 3). The aligned data bytes are then transferred from the temporary storage register to the destination device via data-out bus DO. Although there are four aligned data addresses 63-66 in the temporary storage register 20, the destination device is a 16-bit device. Accordingly, the 16-bit destination device can only receive data bytes from storage locations 0 and 1. Thus, only data address 63 and 64 which are stored in storage location 0 and 1, respectively, are transferred to the 16-bit destination device, as shown in FIG. 7(B).

Figure 7C:
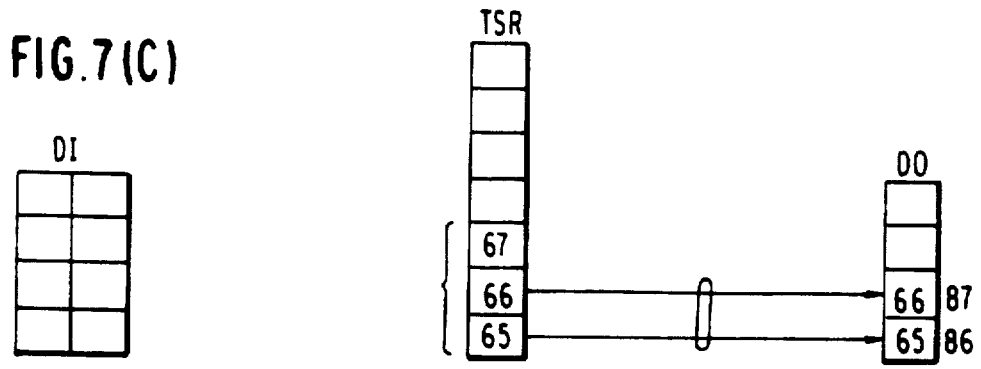

The counter 40 is then decremented by two since data bytes 63 and 64 were transferred (step 5). Since the decremented counter 40 is equal to two (i.e., 4−2=2; step 6), the remaining data addresses 65-67 in the temporary storage register 20 are rolled-down (step 9), as shown in FIG. 7(C). In particular, each of the data addresses 65-67 is rolled-down two storage locations since the most significant storage location of the data bytes last transferred (i.e., 63-64) is location 1. Referring to FIG. 7(C), 'data addresses' 65 and 66 are then transferred to the destination device (step 4), and the counter 40 is decremented by two (step 5). Since the decremented counter is now equal to zero (step 6), and since 'data address' 67 remains in the temporary storage register 20, this 'data address' 67 is rolled-down two storage locations, as shown in FIG. 7(D) (step 10).

Figure 7D:
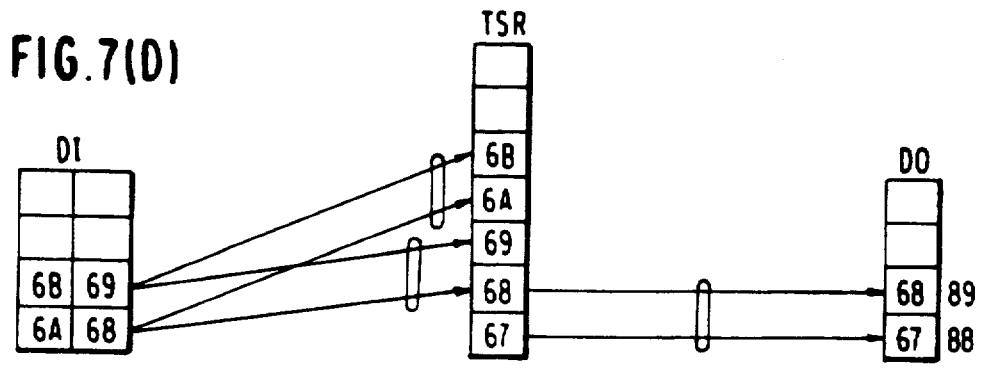

Thereafter, the next double word (i.e., 68, 69, 6A and 6B) is fetched (step 11) and loaded into the temporary storage register 20 after the rolled-down data address 67 (step 12), as also shown in FIG. 7(D). The procedure would continue in a similar manner until all data bytes in the data block are transferred to the destination device.

The circuitry for implementing the temporary storage register 20 and the gating circuitry 30 of FIG. 1 will now be described. Referring to FIG. 8, the temporary storage register 20 includes seven D-type register (8 bits wide) D0-D6. The gating circuitry 40 includes thirteen multiplexers M0-M6 and RD1-RD6. Registers D0-D5 are connected to receive the outputs of multiplexers M0-M5, respectively. The registers D0-D6 are also connected to receive data bytes via multiplexers 0DI- -6DI, respectively. The data bytes 0DI-6DI correspond to data bytes stored in locations 0-6, respectively, of the temporary storage register 20. Each of the multiplexers M0-M6 also receives a data set signal Dset which, when active, causes data inputs 0DI-6DI to be outputted from multiplexers M0-M6, respectively. Accordingly, during step 2 of FIG. 2, the data set signal Dset is active so that fetched data bytes from the source device can be loaded into the temporary storage register 20.

The multiplexers Rd1-RD6 function to perform the roll-down operation discussed above. Multiplexers receive inputs as shown in FIG. 8, and a 2-bit roll-down signal RD which serves as a select signal. In particular, one of the four inputs is outputted from multiplexers RD1-RD6 according to the roll-down control signal RD. One of four different roll-down signals RD is supplied to multiplexers RD1-RD6. The Table shown in FIG. 9 shows the relationship between a given byte enable signal BE, the location of the last data bytes transferred from the temporary storage register 20, for respective bus sizes of 32 bits ("BS32") 16 bits ("BS16"), and 8 bits ("BS8"), and the resulting roll down values for these respective bus sizes.

In particular, as discussed above, and as shown in FIG. 9, the roll-down value is selected such that it corresponds to a roll-down amount of one more than the most significant storage location of the last data bytes transferred. The roll-down values can be obtained from the decoder shown in FIG. 8 having a decoding function as shown in the table of FIG. 9. For example, assume that the destination device is a 32-bit device and that four data bytes are loaded into registers D2-D5, respectively. The data bytes stored in registers D2 and D3 would then be transferred to the destination device. This transfer corresponds to a byte enable signal BE which is equal to C (HEX). In this case, the most significant storage location of the last data bytes transferred is location 3 which corresponds to register D3 of the temporary storage register 20. Accordingly, roll-down signal RD=4 would be selected and supplied to multiplexers RD1-RD6. The roll-down select signal RD=4 causes the multiplexer RD1-RD6 to output the fourth input. Thus, multiplexers RD1 would output the data byte stored in register D4 and multiplexer RD2 would output the data byte stored in register 5. During this time, the data set signal Dset is inactive, thereby causing multiplexers M0 through M5 to select the outputs of multiplexers RD1 through RD6, respectively. Thus, after the roll-down operation, the data bytes previously stored in registers D4 and D5 would be stored in registers D0 and D1, respectively.

The gating circuitry for performing the data duplication method of the invention will now be described.

As discussed above, those data transfer situations shown in FIGS. 6(A)-6(F) cannot be properly transferred to 16-bit or 8-bit devices, because the output bus of the DMA controller 10 is 32-bits wide, whereas the input buses of 16-bit and 8-bit destination devices are 16-bits and 8-bits wide, respectively. More specifically, data bytes stored in registers D2 and D3 of the temporary storage register 20 cannot be received by a 16-bit or an 8-bit device. Accordingly, in order for data bytes stored in registers D2 and D3 to be received by a 16-bit or an 8-bit device, it is necessary for these data bytes to be placed on the data-out bus DO so that they correspond to outputs from registers D0 and D1 (in the case of a 16-bit destination device) or register D0 (in the case of an 8-bit destination device).

FIG. 10 is a schematic diagram showing gating circuitry for performing the "data duplication" method of the invention. The data duplication gating circuitry can be implemented using two multiplexers 60 and 70, and two decoders 80 and 90, as shown in FIG. 10. Multiplexer 60 is connected to receive the outputs of registers D1 and D3. Multiplexer 70 is connected to receive the outputs of registers D0 through D3. Multiplexer 60 is also connected to receive a select signal which is the output of decoder 80, and multiplexer 70 is connected to receive a select signal which is the output of decoder 90.

The decoders 80 and 90 are each connected to receive the byte-enable signals BE(0-3). As discussed in connection with FIG. 1, the byte enable signals BE(0-3) indicates to the destination device where on the 32-bit data-out bus DO valid data may be found. In other words, the byte enable signals BE(0-3) tells the destination device where on the 32-bit data-out bus to look for incoming data.

Both decoders 80 and 90 receive the byte-enable signals BE(0-3) and, in accordance therewith, output a select signal to multiplexers 60 and 70, respectively. For example, if byte-enable signals BE(0-3) are equal E (i.e., BE=E HEX), then the decoder circuits 80 and 90 would each output a select signal to the multiplexers 60 and 70, respectively, such that the second input of the multiplexers 60 and 70 would be selected. Accordingly, multiplexers 70 and 80 would both select the output from register D1 as their 8-bit output. This example corresponds to the situation shown in FIG. 6(C).

On the other hand, if, for example, the byte-enable signal BE is equal to C (i.e., BE=C), which corresponds to the data transfer situation in FIG. 6(E), then decoder 80 would output a select signal to multiplexer 60 so that this multiplexer selects the output of latch D3, and decoder 90 outputs a select signal to multiplexer 70 so that multiplexer 70 would select the output of register D2.

In this way, it is seen that data bytes stored in more significant storage locations of the temporary storage register 20 can also be transferred to 16-bit and 8-bit devices. As discussed above in connection with FIGS. 6(A)-6(F), the DMA controller 10 outputs a byte-enable signal BE which corresponds to the data bytes stored in locations 0-3 of the temporary storage register 20. However, byte enable signals BE(0-3) assumes a 32-bit source/destination device. Thus, when the data duplication method used in the invention is employed, the byte enable signals BE(0-3) will not always represent the same 8-bit line(s) of the data-out bus DO utilized when making a data transfer to or from a 32-bit source/destination device. In order for the byte enable signals BE(0-3) to correspond to the actual 8-bit line(s) of the data-out bus DO utilized for data transfer, it is necessary for 16-bit and 8-bit devices to include a decoder similar to either the decoder 80 or 90 of FIG. 10 which decodes the byte enable signals BE(0-3) supplied from the DMA controller 10.

Although specific gating circuitry has been described in connection with FIGS. 9 and 10, those skilled in the art will understand that other circuitry may be used to implement the roll-down and data duplication methods of the invention.

Further, although the present invention has been described in connection with a DMA mode of data transfer, those skilled in the art will understand that the data transfer circuitry and method of the present invention may be employed in a CPU.

What is claimed is:

1. A method of transferring a plurality of data items, stored in sequential storage locations starting at a first predetermined storage location of a source device, to sequential storage locations starting at a first predetermined storage location of a destination device, a each of said plurality of data items being defined as a plurality of data bits, the source and destination devices each having a plurality of full data word locations, each of said plurality of full data word locations, each of said plurality of full data word locations being defined as a predetermined number N of sequential storage locations, each of said sequential storage locations corresponding to one of N different positions of a full data word location, data items stored in N storage locations of a full data word location forming a full data word, the data item stored in a first one of the N sequential storage locations of a full data word location being termed an even data item, and data items which are not stored in the first one of the N sequential storage locations of a full data word being termed odd data items, and the source device's full data word location which contains the data item stored at the first predetermined storage location of the source device being designated an Si full data word location, the method comprising the steps of:

(A) transferring at least one data item from the source device to a temporary storage register having a plurality of sequential storage locations arranged from a least significant storage location to a most significant storage location, N designated sequential register storage locations being defined as a temporary full data word location, each of the N designated sequential register storage locations corresponding to one of N different positions of the temporary full data word location, the at least one data item transferred to the register corresponding to a series of data items starting with the data item stored in the first predetermined storage location of the source device up to but not including the even data item of the next full data word Si+1, the at least one data item being transferred to the register such that at least the data item corresponding to the first predetermined storage location of the source device is aligned with the first predetermined storage location of the destination device, a given data item stored in the register being aligned with a given storage location of the destination device only if the given data item is stored in that one of the N designated register storage locations which has the same position of the temporary full data word location as the position of the given destination device storage location of the destination device full data word location which contains the given destination device storage location;

(B) transferring all aligned data items in the register to the destination device;

(C) rolling-down, in sequence, any remaining data items in the register to the least significant storage locations thereof;

(D) loading a full data word, from source device locations starting with the storage location corresponding to the even data item of said next full data word Si+1 up to but not including the storage location corresponding to the even data item of a following data word Si+2, into the register at sequential storage locations thereof which are more significant storage locations than the register's most significant storage location containing a data item;

(E) transferring at least one data item stored in the register, starting with the least significant storage location containing a data item therein, to the destination device; and repeating steps (C)-(E) until the transfer of said plurality of data items is completed.

2. The method as claimed in claim 1, wherein the register contains storage locations for storing 2N-1 bytes of data.

3. The method as claimed in claim 2, wherein N is equal to 4.

4. A method of transferring a plurality of data items, stored in sequential storage locations starting at a first predetermined storage location of a source device, to sequential storage locations starting at a first predetermined storage location of a destination device, each of said plurality of data items being defined as a plurality of data bits, the source and destination devices each having a plurality of full data word locations, each of said plurality of full data word locations being defined as a predetermined number N of sequential storage locations, each of said sequential storage locations corresponding to one of N different positions of a full data word location, data items stored in N storage locations of a full data word location forming a full data word, the data item stored in a first one of the N sequential storage locations of full data word location being termed an even data item, and data items which are not stored in the first one of the N sequential storage locations of a full data word being termed off data items, and the source device's full data word location which contains the data item stored at the first predetermined storage location of the source device being designated an Si full data word location, the method comprising the steps of:

(A) transferring at least one data item from the source device to a temporary storage register having a plurality of sequential storage locations arranged from a least significant storage location to a most significant storage location, N designated sequential register storage locations being defined as a temporary full data word location, each of the N designated sequential register storage locations corresponding to one of N different positions of the temporary full data word location, the at least one data item transferred to the register corresponding to a series of data items starting with the data item stored in the first predetermined storage location of the source device up to but not including the even data item of the next full data word Si−1, the at least one data item being transferred to the register such that at least the data item corresponding to the first predetermined storage location of the source device is aligned with the first predetermined storage location of the destination device, a given data item stored in the register being aligned with a given storage location of the destination device only if the given data item is stored in that one of the N designated register storage locations which has the same position of the temporary full data word location as the position of the given destination device storage location of the destination device full data word location which contains the given destination device storage location;

(B) transferring all aligned data items in the register to the destination device via a data bus, the transferred data items being placed at locations on the data bus such that the destination device can receive the transferred data items;

(C) rolling-down, in sequence, any remaining data items in the register to the least significant storage locations thereof;

(D) loading in full data word, from source device locations starting with the storage location corresponding to the even data item of said next full data word $Si-1$ up to but not including the storage location corresponding to the even data item of a following data word $Si=2$, into the register at sequential storage locations thereof which are more significant storage location than the register's most significant storage location containing a data item;

(E) transferring at least one data item stored in the register, starting with the least significant storage location containing a data item therein, to the destination device, and repeating steps (C)-(E) until the transfer of said plurality of data items is completed.

5. The method as defined in claim 4, further comprising the steps of setting a counter equal to the number of aligned data addresses in the register, and performing said full data word loading step only after the counter is set equal to zero.

6. The method as defined in claim 5, wherein said counter setting step includes decrementing the counter by the number of data items transferred from the register to the destination device.

7. The method as defined in claim 5, further comprising the steps of:

determining whether any data items are left in the register, said determining step being performed only after the counter is set equal to zero;

said step of rolling-down, in sequence, any data items in the register to least significant storage locations thereof being performed only if the counter is set equal to zero and said determining step determines that there is at least one data item still left in the register.

8. A device for transferring a plurality of data items, stored in sequential storage locations starting at a first predetermined storage location of a source device to sequential storage locations starting at a first predetermined storage location of a destination device, each of said plurality of items data being defined as a plurality of data bits, the source and destination devices each having a plurality of full data word locations, each of said plurality of full data word locations being defined as a predetermined number N of sequential storage locations, each of said sequential storage locations corresponding to one of N different positions of a full data word location, data items stored in N storage locations of a full data word location forming a full data word, the data item stored in a first one of the N sequential storage locations of a full data word location being termed an even data item, and data items which are not stored in the first one of the N sequential storage locations of a full data word being termed odd data items, and the source device's full data word location which contains the data item stored at the first predetermined storage location of the source device being designated an $Si$ full data word location, the device comprising:

means for transferring at least one data item, from the source device to a temporary storage register having a plurality of sequential storage locations arranged from a least significant storage location to a most significant storage location, N designated sequential register storage locations being defined as a temporary full data word location, each of the N designated sequential register storage locations corresponding to one of N different positions of the temporary full data word location, the at least one data item transferred to the register corresponding to a series of data items starting with the data item stored in the first predetermined storage location of the source device up to but not including the even data item of the next full data word $Si=1$, the at least one data item being transferred to the register such that at least the data item corresponding to the first predetermined storage location of the source device is aligned with the first predetermined storage location of the destination device, a given data item stored in the register being aligned with a given storage location of the destination device only if the given data item is stored in that one of the N designated register storage locations which has the same position of the temporary full data word location as the position of the given destination device storage location of the destination device full data word location which contains the given destination device storage location;

means for transferring all aligned data items in the register to the destination device;

means for rolling-down, in sequence, any remaining data items in the register to the least significant storage locations thereof; and loading means for loading a full data word, from source device locations starting with the storage location corresponding to the even data item of said next full data word $Si=1$ up to but not including the storage location corresponding to the even data item of a following data word $Si=2$, into the register at sequential storage locations thereof which are more significant storage locations than the register's most significant storage location containing a data item; and wherein said transferring means is also operable for transferring at least one data item stored in the register, starting with the least significant storage location containing a data item therein, to the destination device.

9. The device as defined in claim 8, further comprising a counter, means for setting said counter equal to the number of aligned data items in said register, and means for decrementing said counter by the number of data items transferred from said register to the destination device.

10. The device as defined in claim 9, wherein said loading means is operable for loading a full data word into said register only after the counter is equal to zero.

11. The device as defined in claim 10, wherein said register has storage locations for 2N-1 bytes of data.

12. The device as defined in claim 11, wherein N is equal to 4.

13. The device as defined in claim 8, wherein said device is a DMA controller.

14. The device as defined in claim 8, wherein said temporary storage register comprises 2N-1 latches.

15. The device as defined in claim 14, wherein the outputs of N of said latches are coupled to the destination device, and wherein said transferring means includes an output bus coupled between the outputs of said latches and the destination device, and gating means, disposed between the outputs of said latches and said output bus, said gating means receiving the outputs of each of said latches and being operable for placing an output of at least one of said latches at a location on the output bus which corresponds to the output of at least another one of said latches, each of said latches corresponding to a different one of the plurality of sequential storage locations of said temporary storage register.

16. The device as defined in claim 15, wherein said device includes means for outputting a byte-enable signal which identifies locations on the output bus where valid data can be found.

17. The device as defined in claim 16, wherein said gating means in controlled by the byte-enable signal.

18. The device as defined in claim 15, wherein said at least another one of said latches corresponds to a less significant storage location of the temporary storage register than the storage location of the temporary storage register corresponding to said at least one of said latches.

19. The device as defined in claim 8, wherein said rolling-down means comprises a plurality of multiplexers, and wherein an amount of roll-down of data items in said register by said roll-down means is determined in accordance with the byte enable signal.

20. The device as defined in claim 19, wherein said loading means includes a plurality of multiplexers coupled between the inputs of said temporary storage register and the outputs of said rolling-down means, each of said plurality of multiplexers of said loading means having an input for receiving a data item from the source device.

* * * * *